March 8, 1932.　　　A. E. LINENDOLL　　　1,848,488
BRAKE TESTER
Filed March 31, 1928
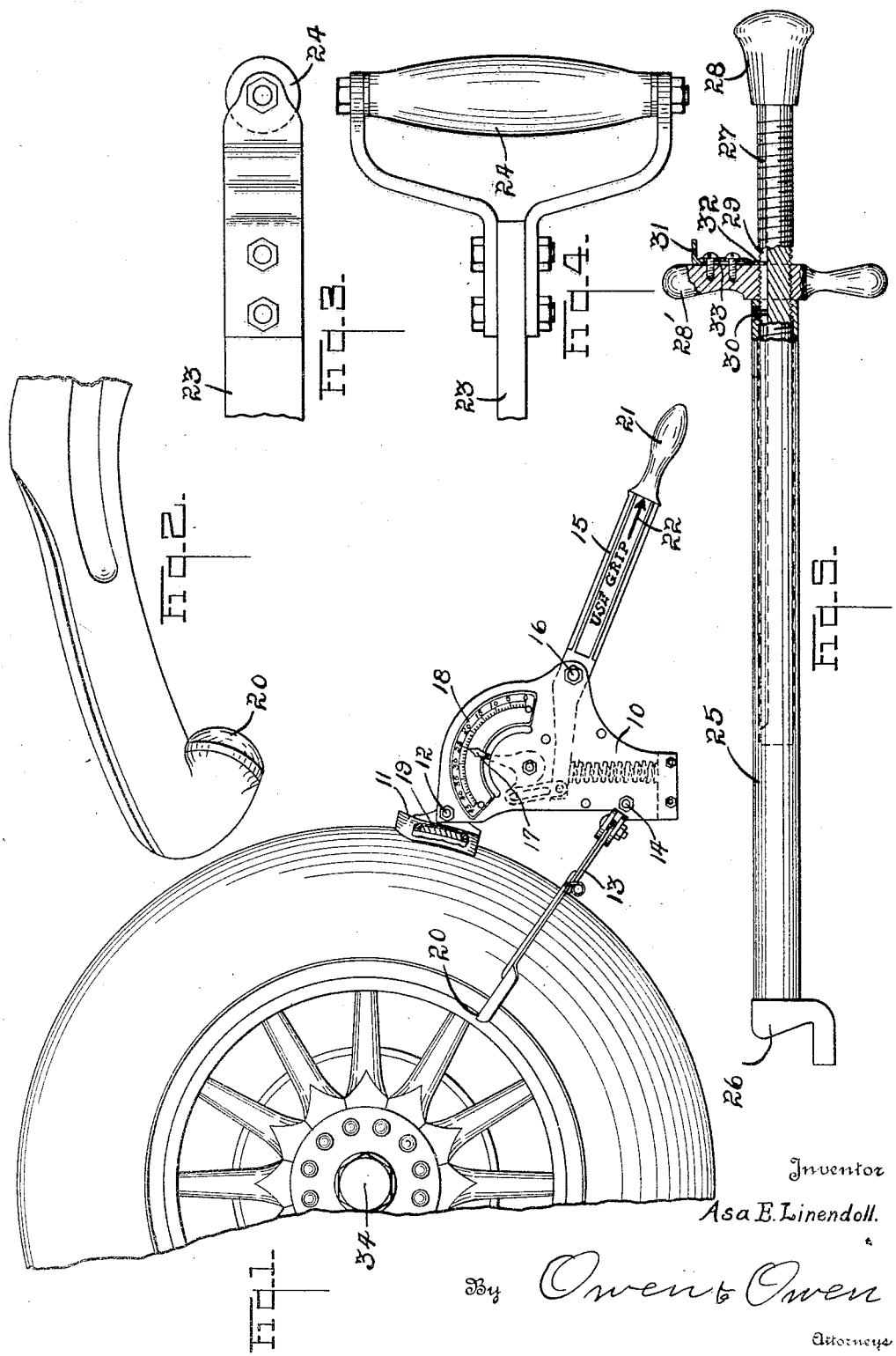
Inventor
Asa E. Linendoll.
By Owen & Owen
Attorneys Patented Mar. 8, 1932

1,848,488

UNITED STATES PATENT OFFICE

ASA E. LINENDOLL, OF NORWALK, OHIO

BRAKE TESTER

Application filed March 31, 1928. Serial No. 266,146.

This application relates to improvements in brake testers and the object of the invention is to produce a tester which will measure with accuracy the resistance of brakes while holding them applied at a constant pressure. The present invention is an improvement upon the device disclosed in my prior application for brake testing device, Serial No. 220,905, filed September 21, 1927. Details of the invention will appear as the description proceeds.

In the accompanying drawings forming a part of this specification, Figure 1 is a side elevation of a portion of an automobile wheel with a brake testing device applied thereto, the device embodying features of the present invention; Fig. 2 is a detail view of the end of one of the tong members; Fig. 3 is a detail view of an alternative form of lever handle for the tester; Fig. 4 is a plan view of the form of handle shown in Fig. 3; Fig. 5 is a view of a device for holding a brake pedal depressed, parts being broken away to disclose the construction.

In the form of brake tester disclosed, there is a casing 10 to which a tire contacting member 11 is pivoted at 12. Tongs 13 for gripping the rim of the wheel are pivoted to the casing at 14. A lever 15 pivoted to the casing at 16 is connected in a suitable manner to a pointer 17 which indicates on a scale 18 the movement of the lever with respect to the casing. It will be understood that a spring within the casing resists movement of the lever with respect to the casing in a similar manner to that shown in the aforesaid application, and thereby the pointer 17 indicates on scale 18 the resistance of the brake when a wheel is turned by application of force to the lever.

The tire contacting member is faced with friction material 19, as shown where broken away in Fig. 1. In this way slippage of the member along the tire is prevented.

The ends of the tong members are preferably provided with rounded surfaces 20 for gripping the rim of the wheel. This makes the tongs self-adjusting on the rim. In order to have the pointer correctly indicate the resistance of the brake, it is necessary for the force to be applied on lever 15 at approximately the same point each time. For this purpose the end of the lever is provided with a handle 21 so that it will be gripped at approximately the same point each time.

When the lever is provided with a handle as indicated, it is natural for the operator to grip the lever at the point provided for that purpose. In order to guard against seizing the lever at a point nearer its fulcrum, or using one hand on the handle and another hand between that and the fulcrum, directions are printed on the lever, at 22, indicating the place where the lever is to be gripped.

In Figs. 3 and 4 there is indicated a lever 23 having a different form of handle 24. It will be readily seen that gripping the handle 24 necessarily applies the force at a fixed distance from the fulcrum of the lever. Such a handle as indicated in Figs. 3 and 4, may be used when desired, but for ordinary purposes the handle shown in Fig. 1 is sufficiently accurate and is handier in some respects.

In order to provide for holding the brake pedal in fixed position while the brakes are being tested, a depressor is employed similar to that shown in the above identified application. The depressor comprises a hollow rod 25 having a foot 26 adapted to be applied to the pedal. A threaded rod 27 is provided with a head 28 adapted to contact the seat of an automobile. A groove 29 in rod 27 is adapted to receive a screw 30 through rod 25 and prevent threaded rod 27 from turning therein.

A handled nut 28' is threaded on rod 27 and may be screwed against the end of hollow rod 25 to limit the entrance of rod 27 therein. A slide 31 is provided with a point 32 adapted to enter groove 29 and is adjustably attached to nut 28' as by means of screws 33 passing through slots in the slide. When the nut has been screwed down so that the brake is properly adjusted, slide 31 may be shoved down until its point enters groove 27 whereupon the holder is securely locked in place and the nut cannot be turned until slide 31 is pulled outward to release it.

In order to bring out the advantage of having lever 15 gripped at a definite point, the following calculations might be indicated. We will suppose that it requires a lift of twenty-five pounds on handle 21 to turn the wheel against the resistance of the brake, and that a lift of this amount on handle 21 will move the pointer to indicate 25 on the scale. Suppose by way of example that it is twenty-four inches from the axis 34 of the wheel to fulcrum 16 and twelve inches from fulcrum 16 to the point where the lifting force is applied on handle 21 and four inches from fulcrum 16 to the point where the spring resists the movement of the other end of lever 15. In that case, a lift of twenty-five pounds on handle 21 exerts a compressive force of three times twenty-five, or seventy-five, pounds upon the spring. If the grip were moved four inches towards fulcrum 16 and applied at a distance of eight inches from the fulcrum, it would be applied at thirty-two inches from axis 34. This being the case, it would require nine pounds at the new point of grip to exert as much turning effect upon the wheel as eight pounds at the end of the handle, or a pull of twenty-eight and one eighth pounds to overcome the resistance of the brake. This new point of grip would be only twice as far from fulcrum 16 as the point of resistance of the spring and therefore the compressive effect upon the spring of the pull of twenty-eight and one eighth pounds would equal fifty-six and one quarter pounds at the spring instead of seventy-five, but the indicator is intended to indicate the force applied to handle 21 and at three times the distance of the spring from the fulcrum, and therefore the pointer would indicate one-third of the compressive force applied to the spring, and when the force is applied at the new point, the indicator would stop at eighteen and three fourths pounds instead of indicating twenty-five as it should when the wheel began to turn. It will be seen from this that if the lever were gripped at twelve inches from its fulcrum when turning one wheel and at eight inches from the fulcrum when turning the other wheel, the indicator might indicate the same resistance, when the resistance of the brakes was in fact considerably different, or it might indicate a different resistance when the actual resistance was the same. For this reason it is essential that the lifting force shall be applied at substantially the same point on the lever for testing each brake in order to make the results properly comparable.

If the lever were at a considerable angle to the radius of the wheel when force was being applied to turn the wheel, application of the force lengthwise of the lever might have a sufficiently great modifying effect upon the reading of the indicator to render results unreliable; but when the lever is substantially radial of the wheel at the time when the reading of the indicator is taken it will be readily understood that any force applied in either direction longitudinally of the lever would have substantially no turning effect upon the wheel and therefore the indicator which indicates the lateral component of force applied on the lever also measures the component of force which tends to turn the wheel.

By providing the ends of the tongs with the rounded contact surfaces 20, it is insured that they will slip along the rim until they are self-centered. The tongs are pivoted at 14 and will slip at 20 until they are in proper lateral position and until the tongs are approximately radial of the wheel. The casing is thereby held in an approximately fixed position with relation to the wheel so that the comparative angle of the various parts is fixed. If the points of the tongs did not become properly centered upon the rim or if the contact member 11 slipped on the tread of the tire after force was applied to the tongs sufficiently to hold them in position, the angle of the tongs and thereby the relation of the parts would be disturbed.

Furthermore, with the construction shown, it will be readily apparent that any dropping of lever 15 results in a loosening of the tongs so that their points slide downward on the rim and at the same time contact member 11 is loosened sufficiently so that it also slides downward. Immediately upon applying lifting force to the lever, the tongs and contact member are tightened upon the rim and tread respectively and do not slip thereafter. This allows for a ratcheting movement of the implement along the tire and tread so that the wheel may be given a complete turn if desired. When this is done and the resistance of the brake at various points during the turning of the wheel is noted, any irregularities of resistance due to improper shape of the drum or to other causes, is promptly revealed. In this way the brake tester becomes an implement by which the operator can test not only the relative resistance of the various brakes but also the resistance of any one brake when the wheel is in different positions about its axis.

It will be apparent that various modifications can be made in the disclosed device within the scope of the appended claims.

What I claim is:

1. A device for turning a braked wheel, comprising means for gripping the rim of the wheel, a lever pivoted to said means and adapted to apply turning force to the wheel through the means, and means intermediate the lever and the first named means for measuring the force applied to the lever, the lever being substantially radial of the wheel when the wheel-moving force is applied thereto and the lever having thereon a handle indicating the point at which wheel-moving force is to be applied.

2. Apparatus for turning an automobile wheel against the resistance of a brake comprising a casing, tongs pivoted to the casing and adapted to grip the rim of the wheel, a tread contacting member pivoted to the casing and adapted to contact the tread of a tire, a spring resisted lever pivoted to the casing and adapted to move the casing about the axis of the wheel by force exerted through the spring and indicating means for indicating the turning force applied by the lever, the ends of the tongs being rounded for self-adjustment upon the rim.

In testimony whereof, I have hereunto signed my name to this specification.

ASA E. LINENDOLL.